US009394209B2

United States Patent
McCoy, Jr. et al.

(10) Patent No.: US 9,394,209 B2
(45) Date of Patent: Jul. 19, 2016

(54) ALTERNATIVE METHOD FOR THE MANUFACTURE OF GRANULATED NUTRIENTS

(71) Applicant: NutriChem Marketing, Inc., Dunedin, FL (US)

(72) Inventors: Paul E. McCoy, Jr., Dunedin, FL (US); Shawn McCoy, Dunedin, FL (US)

(73) Assignee: NutriChem Marketing, Inc., Dunedin, FL (US)

( * ) Notice: Subject to any disclaimer, the term of this patent is extended or adjusted under 35 U.S.C. 154(b) by 0 days.

(21) Appl. No.: 14/561,259

(22) Filed: Dec. 5, 2014

(65) Prior Publication Data

US 2016/0159706 A1 Jun. 9, 2016

(51) Int. Cl.
- *C05D 9/00* (2006.01)
- *C05D 9/02* (2006.01)
- *C05G 3/00* (2006.01)

(52) U.S. Cl.
CPC ............... *C05G 3/0058* (2013.01); *C05D 9/00* (2013.01); *C05D 9/02* (2013.01)

(58) Field of Classification Search
None
See application file for complete search history.

(56) References Cited

U.S. PATENT DOCUMENTS

| | | | |
|---|---|---|---|
| 3,567,460 A | 3/1971 | McCoy | |
| 4,026,718 A | 5/1977 | Cornille et al. | |
| 4,442,215 A | 4/1984 | Vognsen et al. | |
| 5,487,772 A | 1/1996 | McCoy | |
| 6,461,399 B1 * | 10/2002 | Connell | 71/11 |
| 7,635,404 B1 * | 12/2009 | Devic et al. | 71/11 |
| 7,691,169 B2 | 4/2010 | McCoy, Jr. | |
| 7,789,931 B2 * | 9/2010 | Burnham et al. | 71/11 |
| 8,163,672 B2 * | 4/2012 | Birthisel | 504/101 |
| 8,557,013 B2 * | 10/2013 | Burnham et al. | 71/11 |
| 2002/0185447 A1 | 12/2002 | Blount | |
| 2003/0126898 A1 * | 7/2003 | You | 71/11 |
| 2009/0162892 A1 | 6/2009 | Pompejus et al. | |
| 2011/0214465 A1 * | 9/2011 | Peacock et al. | 71/28 |
| 2012/0064574 A1 | 3/2012 | Tokuyasu et al. | |

FOREIGN PATENT DOCUMENTS

| WO | 2006034590 | 4/2006 |
|---|---|---|
| WO | 2011149956 | 12/2011 |

\* cited by examiner

*Primary Examiner* — Wayne Langel
(74) *Attorney, Agent, or Firm* — Larson & Larson, P.A.; Patrick A. Reid; Justin P. Miller

(57) ABSTRACT

Method of making a soil dispersible and water dispersible granular nutrient for use in fertilizers or animal feeds. A sulfuric acid solution is sprayed onto a mixture of reducible nutrient compounds and dry carbohydrates. The sulfuric acid converts the carbohydrates to their reducing forms. The reducing saccharides then react with the reducible nutrient compounds to form a carboxylated nutrient. The carboxylated nutrient is bound by polysaccharides and rolled up on itself to form a granule. The sulfuric acid also acts on the nutrient compounds directly to create sulfated nutrients. The process results in a product containing both carboxylated and sulfated metal nutrients.

18 Claims, 1 Drawing Sheet

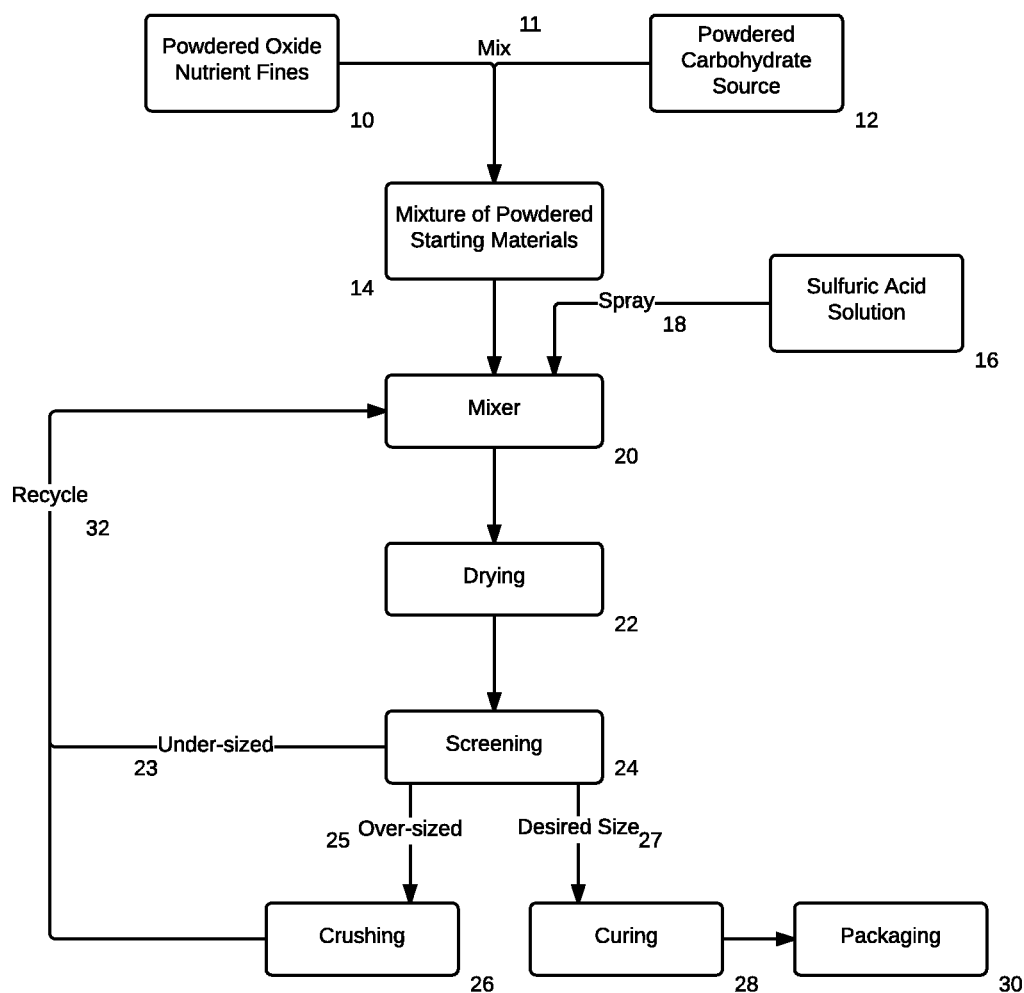

ALTERNATIVE METHOD FOR THE MANUFACTURE OF GRANULATED NUTRIENTS

FIELD

This invention relates to a method of producing a granular nutrient. More particularly, to a method of producing a granular carboxylate nutrient without the use of molasses.

BACKGROUND

In prior methods it was necessary to use liquid molasses as a source of reducing sugars. The liquid molasses also bound the powdered nutrients into granules. The water added to the molasses and the subsequent drying of the granule in a rotary dryer caused the sugars to hydrolyze and complex with the nutrients.

SUMMARY

Prior methods of making nutrient granules in the presence of sulfuric acid without molasses resulted in only sulfates and oxysulfates. With this invention, any source of starch or carbohydrate or hydrated molasses may be used. It is the purpose of this invention to produce a nutrient that includes both sulfate and carboxylate without the need for two separate processes to create each of these desirable nutrient products.

The product of this reaction has many advantages over the previous method. First, more reducing sugars are produced which leads to a greater portion of material converted to carboxylate. This increase in complexed material leads to increased solubility as well as a harder granule that is more resistant to tie up. Tie up is when the nutrient in the soil oxidizes to an unavailable valence state making it no longer agronomically available. The harder granule is more resistant to moisture and humidity, which leads to longer shelf life, better blending properties, less caking, and less dusting.

Additionally, this product increases microbial activity in soil thereby increasing availability of all surrounding nutrients.

Within the description of the invention, certain terms are defined as follows:

"Water dispersible" means that the granule falls apart, bursts apart, and/or separates into fines when the granule comes into contact with water.

"Soil dispersible" means that the granule falls apart, bursts apart, and/or separates into fines when placed into contact with moisture in soil.

"Nutrient compound" includes major nutrients, secondary nutrients, micronutrients, minor elements, and trace minerals. These constituents are described below.

"Major nutrients" are the minimal nutrients a plant requires to sustain life. These are nitrogen, phosphorous, and potassium.

"Secondary nutrients" are materials that are required by a plant to improve growth. Substantial quantities of secondary nutrients are required, but lesser quantities as compared to major nutrients. These are calcium, magnesium, and sulfur.

"Micronutrients," "minor elements," and "trace elements" are materials that are required by plants in lesser amounts than either major nutrients or secondary nutrients. Micronutrients, minor elements, and trace elements act to improve plant growth and health. These are formed when an element of nutrient value combines with one or more of oxygen, sulfur, carbon, hydrogen, nitrogen, and other salts. Some elements of nutrient value are: manganese, zinc, copper, iron, chlorine, boron, and molybdenum. Therefore, examples of a micronutrient are manganese oxide (MnO), ferrous oxide (FeO), ferric oxide ($Fe_2O_3$), and zinc oxide (ZnO).

"Fines" are particles ranging in size from 60 mesh United States standard sieve down to particles of one micron or smaller.

The present invention is a method that produces granular plant nutrient compounds. Nutrient compounds of the present invention are formed by agglomerating and acidulating or otherwise binding the fines into a granule. During the process, the nutrients undergo a reaction with the sulfuric acid whereby carboxylated nutrients derived from starch or carbohydrates, and sulfated nutrients are produced. During the granulation process, the carboxylated and sulfated nutrients are bound by polysaccharides and rolled up into granules.

As a result of the reaction, a small amount of carbon dioxide gas is entrapped in the granule. When the polysaccharides come into contact with moisture in the soil, the polysaccharides begin to dissolve. As moisture in the soil dissolves the polysaccharides and the sulfated material, the entrapped gas releases in a burst that helps to disperse the carboxylated and sulfated nutrients throughout the soil.

In one embodiment, the invention provides a soil dispersible and water dispersible granular nutrient for use in fertilizers or animal feeds. The nutrient includes granules that are comprised of a saccharide complex with carboxylates or sulfates of a nutrient. The granules are formed when the molecule rolls up on itself. The method is summarized by the following steps.

First, powdered oxide nutrient fines are premixed with a dry starch or carbohydrate source, creating a mixture.

Second, the mixture is transferred into a mixing container.

Next, the mixture is sprayed with a sulfuric acid solution. The sulfuric acid acts as a catalyst for the hydrolysis of the sugars and complexing of the oxide nutrients. When the sulfuric acid solution contacts the carbohydrate or starch source, it converts the carbohydrates or starches into reducing sugars. The reducing sugars then react with the metal oxide nutrients to produce the carboxylate complex. The sulfuric acid also results in a portion of the metal oxide nutrients becoming metal sulfates. For example, $FeSO_4$, $MnSO_4$, and $ZnSO_4$. The heat released by the reaction causes larger polysaccharide molecules to complex with and roll up the carboxylated and sulfated nutrients forming a granule.

Next, after mixing for a sufficient amount of time to obtain the desired granule size, the granules are dried to remove excess water from the product.

Finally, after drying, the product is screened to sort the granules by size. Granules that are too small are recycled, or added back into the reaction, at the mixing step. Granules that are too large are sent to be crushed and then recycled back into the mixer. Granules that conform to the desired size are cured before bagging.

BRIEF DESCRIPTION OF THE DRAWINGS

The invention can be best understood by those having ordinary skill in the art by reference to the following detailed description when considered in conjunction with the accompanying drawings in which:

FIG. 1 illustrates a flow chart of the first embodiment.

DETAILED DESCRIPTION

Reference will now be made in detail to the presently preferred embodiments of the invention, examples of which are illustrated in the accompanying drawings. Throughout the following detailed description, the same reference numerals refer to the same elements in all FIGURES.

Preferred nutrients that may be provided in accordance with the invention include major nutrients, secondary nutrients, micronutrients, minor elements, and/or trace elements. Among the nutrients that may be utilized with this invention are cationic nutrients such as manganese, zinc, copper, iron, calcium, potassium, magnesium, boron, and molybdenum.

Referring to FIG. 1, a flow chart of the process is shown. The process utilizes oxide nutrient fines 10 and a dry starch or carbohydrate source 12, each as a starting compound. A dry starch or carbohydrate source 12 is dry enough to be maintained as a powder without changing consistency to a paste or failing to mix 11 with the powdered oxide nutrient fines 10. Dry is dry enough to mix into a homogeneous powder. In one embodiment, both the oxide nutrient fines 10 and the starch or carbohydrate source 12 are powders of size 100 mesh or finer. The starch or carbohydrate source 12 can be in other physical forms, such as, flakes or small granules.

First, the starting materials are mixed 11 together prior to beginning the granulation process. The mixture of powdered starting materials 14 is then added to mixer 20. The mixer 20 can be, but is not limited to, a drum, pug mill, dish, or pelletizing unit. A mixer 20 that can be utilized is, for example, a drum open at one end.

Next, the sulfuric acid solution 16 is sprayed 18 into the mixer 20. The sulfuric acid solution 16 is at least 10% sulfuric acid in water. When the sulfuric acid 16 contacts the starch or carbohydrates 12 present in the mixture 14, the sulfuric acid 16 catalyzes the hydrolysis of the starch and carbohydrates 12 into their reducing forms. The reducing forms of the starch or carbohydrate source 12 are aldehyde disaccharides and monosaccharides.

The starches and/or carbohydrates 12 break down into polysaccharides, and then further break down to disaccharides and monosaccharides. The aldehyde form of the disaccharides, as well as all monosaccharides, are reducing agents. Reducing agents will transfer electrons to the metal oxide nutrients 10, lowering their valence states.

Because the hydrolysis reaction is exothermic, the heat released by the hydrolysis reaction aids the reduction reaction of the disaccharides and monosaccharides with the metal oxide nutrients 10. The result is a carboxylate nutrient complexed with polysaccharides.

In addition to the above chemistry, some of the metal oxide nutrients 10 present in the mixture 14 react directly with the sulfuric acid 16 to produce sulfated nutrients. This reaction also produces heat aiding in the hydrolysis and complexing of the metal oxide nutrients 10. The resulting product of the complete reaction is a blend of carboxylate and sulfate nutrient granules.

Due to the presence of the sulfates, the blend of carboxylate and sulfate nutrient granules has increased solubility as compared to the prior method that uses liquid molasses, which produces only carboxylate nutrients. Because the sulfated material is more soluble than the carboxylated material, the former is more immediately available. On the other hand, the carboxylated material has a greater longevity in the soil (this is due to reduced "tie up" and leaching in the soil) and therefore available over a longer period of time.

This combination of sulfate and carboxylate gives you a much more consistent source of availability than either the sulfate or carboxylate individually would achieve. In addition, in alkaline soils the carboxylated material helps to maintain availability whereas the sulfated material tends to get "tied up."

In one embodiment, the product may be used to create a complete fertilizer. A complete fertilizer will contain sources of nitrogen, phosphate, and potash. If desired, these materials can be added in at the time of blending, along with secondary and micro nutrients, and the finished product would be a homogeneous granule containing major, secondary, and micro nutrient components.

As mixing 20 proceeds, granules are created wherein the sulfated and carboxylated nutrients form a homogeneous granule. And the reaction continues to create more carboxylated and sulfated nutrients. Depending upon the desired size of the granule, time in the mixer 20 preferably varies depending on equipment size, raw materials, and other factors. For example, to create a granule of −6 to +16 mesh size (US standard sieve) will need less time in the mixer 20 than granules of −10 to +20 mesh size.

To better understand the process, a more focused discussion of the chemistry is helpful here.

The water in sulfuric acid solution 16 breaks down higher polysaccharides into both reducing monosaccharides and aldehyde-form disaccharides. These saccharides react with the reducible oxide nutrients 10 to form carboxylates in accordance with the reactions set forth below. The resulting nutrient carboxylate is more available for uptake than the starting oxide nutrients 10. A typical product of the reaction is thus a carboxylate of a cationic nutrient having the general formula:

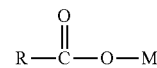

wherein M is the nutrient cation from the group manganese, zinc, copper, iron, calcium, potassium, magnesium, or boron. R is the remaining portion of the saccharide molecule.

Where dioxides are present in the starting oxide nutrient 10, the reaction produces an oxidized carbohydrate side-product that further breaks down to yield carbon dioxide gas. The carbon dioxide gas can be trapped in the granule, which can help disperse nutrients as the polysaccharide binder dissolves.

Without intending to be bound by theory, it is believed that amorphous polysaccharides break down to the aldehyde forms of disaccharides and monosaccharides. Such reducing sugars have the general aldehyde structure:

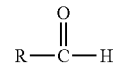

With water and heat, polysaccharides are hydrolyzed to disaccharides and then to monosaccharides. Plants perform this process using photosynthesis and secrete carboxyl groups to take up nutrients in ion exchange reactions.

Monosaccharides also undergo hydrolysis with water to convert from the aldehyde form to the carboxylate ion:

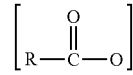

and

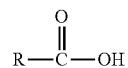

In the presence of some cations, for example zinc and iron, the reaction potential is greater to form a metal carboxylate:

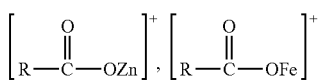

rather than a weak acid

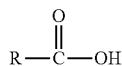

As can be seen from the above ion formations, the monosaccharide is oxidized by reducing the cation oxide. This is to be expected since monosaccharides are reducing agents and act as such in the process.

Turning to a more specific discussion of manganese, it is known that manganese (Mn) acts somewhat differently than the other metal nutrients discussed above in that the x-ray diffraction pattern shows that the Mn++ transitions in and out of the carboxylate structure.

It is known that the carbonyl group

is electron withdrawing. The carbon is partially positive while the oxygen is partially negative. It is also known that manganese has seven different valence states. Manganese is most stable as Mn++++, although it is also stable in the reduced state of Mn++.

Therefore, in the above process, the resulting manganese compound oscillates between (a)

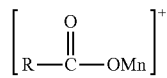

and (b)

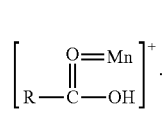

In either case, the reaction can be represented as:

(1)

$$R-\overset{O}{\overset{\|}{C}}-H + H_2O \longrightarrow R-\overset{O}{\overset{\|}{C}}-OH + 2H+ \quad \text{(weak acid)}$$

(2)

$$R-\overset{O}{\overset{\|}{C}}-OH + MnO + H_2 \longrightarrow$$

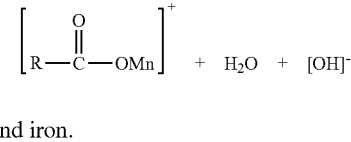

and similarly for zinc and iron.

In the case of (b) above, the reactions are:

(1)

$$R-\overset{O}{\overset{\|}{C}}-H + H_2O \longrightarrow R-\overset{O}{\overset{\|}{C}}-OH + 2H^+ \quad \text{(weak acid)}$$

(2)

As would be expected, the water dispersion of the granular nutrient tests mildly alkaline.

In addition to the carboxylate forming reactions, this new process also produces sulfate nutrients. The following reactions are shown as examples of the sulfate reactions that occur when the powdered oxide nutrients 10 contact the sulfuric acid solution 16.

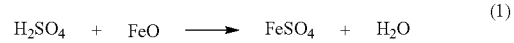

(1)
$$H_2SO_4 + FeO \longrightarrow FeSO_4 + H_2O$$

(2)
$$H_2SO_4 + MnO \longrightarrow MnSO_4 + H_2O$$

(3)
$$2H_2SO_4 + MnO_2 \longrightarrow Mn(SO4)_2 + 2H_2O$$

(4)
$$3H_2SO_4 + 2Fe_2O_3 \longrightarrow Fe_2(SO4)_3 + 6H_2O$$

Reactions 1 and 2 involve the lower valence state of the oxide nutrients 10. Reactions 3 and 4 are stoichiometric examples of oxide nutrients 10 reacting with the sulfuric acid solution 16 in their higher valence states.

Returning to the discussion of the method, the granule produced in the mixer 20 is next fed into a dryer 22. In one embodiment, the dryer is elevated at the closed end. Material enters at the closed end and rolls, as it is dried, toward the open end. In this embodiment, the heat is con-current which means the material enters in at the hot end (source of heat) and exits at the cooler end of the dryer.

In another embodiment, a fluid bed dryer may be used. In a fluid bed dryer, material is vibrated over a current of hot air.

The temperature range of the product upon exit from the dryer is preferably between 160 and 200 degrees F. Higher temperatures are less desirable because the high temperature tends to drive the chemical reaction back to oxides from carboxylates. Times in the dryer 22 will vary depending on moisture content of the input granules, temperature of the dryer 22, the heat produced by the exothermic reaction, and other factors.

The moisture content of the material being fed to the dryer is preferably between 3% and 20% water by weight depending upon the size of the final granules and their porosity. Typical granules have a dryer input moisture content of 10% to 12% water by weight and a dryer output moisture of 1% to 3% water by weight.

After drying 22, the carboxylate granules are screened 24. At this step, all granules above the desired mesh size 25 are removed and fed to a crushing apparatus 26. The crushing apparatus 26 may be any standard crusher known in the industry. All granules below the desired size are screened out 23. Both the oversize granules 25, after crushing 26, and undersize granules 23 are recycled 32 back into the mixer 20 and reprocessed by the method of the invention.

The above steps can be better understood by way of example. If the desired size of granules is −6 to +16 mesh size (US standard sieve), the screening step 24 can utilize a sieve with a mesh corresponding to −6 to +16 mesh size. All granules larger than this, the over-sized granules, will be retained in the sieve while all granules meeting the desired size or smaller will fall through the mesh and be collected.

The large granules that are retained in the sieve will be crushed 26 before being recycled 32 back into the mixer 20.

It is also intended that the granules that made it through the first sieve can be sorted again using a second sieve. This sieve will have a mesh size slightly smaller than −6 to +16 mesh size. This slightly smaller size will retain all granules of the desired −6 to +16 mesh size while letting smaller granules, or under-sized granules, fall through the mesh. The result is a final product with uniform granule size.

The smaller granules can be recycled 32 back into the mixer 20 without going through the crushing apparatus 26.

The properly-sized granules 27 are then sent to a curing step 28. During curing 28, the granules are allowed to rest for sufficient time to permit substantial termination of any exothermic, carboxylate-forming reactions. The product is cured at least until it returns to ambient temperature. Subsequently, the product is sent to packaging 30.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A method for producing granulated nutrients for plants, the method comprising:
    a. blending powdered oxide nutrients;
    b. mixing the powdered oxide nutrients with a dry carbohydrate source; and
    c. adding a sulfuric acid solution to the powdered oxide nutrients and the dry carbohydrate source to form carboxylate and sulfate nutrients.

2. The method of claim 1, wherein the process does not include the use of molasses.

3. The method of claim 1, further comprising drying the product.

4. The method of claim 1, wherein the final product is less than 5% water by weight.

5. The method of claim 1, further comprising: screening the granules to sort the granules by size.

6. The method of claim 3, further comprising: screening the product to sort the granules by size.

7. The method of claim 1, further comprising: curing the product.

8. The method of claim 3, further comprising: curing the product.

9. The method of claim 5, further comprising: curing the product.

10. A method of producing granulated nutrients comprising:
    a. mixing powdered oxide nutrients with a dry carbohydrate source, creating a mixture;
    b. spraying the mixture with a sulfuric acid solution to react the powdered oxide nutrients, the dry carbohydrate source, and the sulfuric acid solution to create carboxylate and sulfate nutrients;
    c. continuing to mix to form granules;
    d. drying the granules;
    e. screening to separate granules by size;
    f. curing the granules; and
    g. optionally, crushing or recycling granules.

11. The method of claim 10, wherein the step of continuing to mix to form granules is performed for 10 to 20 minutes.

12. The method of claim 10, wherein the step of continuing to mix to form granules is performed for 5 to 10 minutes.

13. The method of claim 10, wherein the step of continuing to mix to form granules is performed for 1 to 5 minutes.

14. The method of claim 10, wherein the sulfuric acid solution is of a 10% or greater concentration.

15. The method of claim 10, wherein screening is carried out using a sieve.

16. A method of producing granulated nutrients comprising the steps of:
    a. mixing dry oxide nutrients with a dry carbohydrate source, creating a mixture;
    b. spraying the mixture with a sulfuric acid solution to facilitate the formation of carboxylate and sulfate nutrients;
    c. continuing to mix to form granules;
    d. screening to separate the granules by size;
    e. curing the granules;
    f. recycling the granules that are smaller than −6 to +16 mesh size by adding back into the mixing step;
    g. crushing the granules larger than −6 to +16 mesh size before adding back into the mixing step; and
    h. packaging the granules.

17. The method of claim 16 wherein the step of continuing to mix to form granules is performed for 1 to 5 minutes.

18. The method of claim 16 wherein the step of continuing to mix to form granules is performed for 5 to 10 minutes.

* * * * *